United States Patent
Warner et al.

(10) Patent No.: US 8,152,102 B2
(45) Date of Patent: Apr. 10, 2012

(54) MODULE FOR ACCOMMODATION OF CREW MEMBERS HAVING A STOWAGE BIN USABLE FROM INSIDE THE MODULE

(75) Inventors: Holger Warner, Jork (DE); Felix Helfrich, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 282 days.

(21) Appl. No.: 12/547,223

(22) Filed: Aug. 25, 2009

(65) Prior Publication Data
US 2010/0019087 A1 Jan. 28, 2010

Related U.S. Application Data

(63) Continuation of application No. PCT/EP2008/052287, filed on Feb. 26, 2008.

(60) Provisional application No. 60/891,562, filed on Feb. 26, 2007, provisional application No. 60/891,565, filed on Feb. 26, 2007.

(30) Foreign Application Priority Data

Feb. 26, 2007 (DE) .......................... 10 2007 009 278
Feb. 26, 2007 (DE) .......................... 10 2007 009 280

(51) Int. Cl.
*B64D 11/00* (2006.01)
(52) U.S. Cl. ................................. 244/118.5; 244/118.2
(58) Field of Classification Search ............... 244/118.2, 244/118.5, 118.6; 114/189; 105/316; 296/190.02
See application file for complete search history.

(56) References Cited

U.S. PATENT DOCUMENTS

| | | | |
|---|---|---|---|
| 6,003,813 A * | 12/1999 | Wentland et al. | 244/118.5 |
| 6,073,883 A | 6/2000 | Ohlmann et al. | |
| 6,305,645 B1 * | 10/2001 | Moore | 244/118.5 |
| 6,464,169 B1 | 10/2002 | Johnson et al. | |
| 6,520,451 B1 | 2/2003 | Moore | |
| 6,616,389 B1 * | 9/2003 | Ament et al. | 410/118 |
| 6,848,654 B1 * | 2/2005 | Mills et al. | 244/118.5 |
| 6,986,485 B2 * | 1/2006 | Farnsworth | 244/118.5 |
| 2005/0211834 A1 | 9/2005 | Wisch et al. | |
| 2006/0022087 A1 * | 2/2006 | Defilla et al. | 244/118.5 |

FOREIGN PATENT DOCUMENTS

| | | |
|---|---|---|
| DE | 10361830 A1 | 8/2005 |
| EP | 0901962 A2 | 3/1999 |
| EP | 0901963 A2 | 3/1999 |
| EP | 0901964 A2 | 3/1999 |
| EP | 1010617 A2 | 6/2000 |
| WO | 0130639 A1 | 5/2001 |

OTHER PUBLICATIONS

German Office Action for German Application No. 10 2007 009 280.8-22 mailed Jan. 18, 2011.

* cited by examiner

*Primary Examiner* — Tien Dinh
*Assistant Examiner* — Richard R Green
(74) *Attorney, Agent, or Firm* — Ingrassia Fisher & Lorenz, P.C.

(57) ABSTRACT

A module for an aircraft is provided for the accommodation of crew members. The module includes, but is not limited to a trough-shaped floor region having an external contour that corresponds to the contour of further stowage bins installed in the aircraft. The storage space created in this way in the interior of the module is accessible from the interior of the module. In this way the stability of the module may be enhanced and the installation expenditure may be reduced. Furthermore, comfort may be enhanced, in particular as a result of more space being available for the crew.

19 Claims, 7 Drawing Sheets

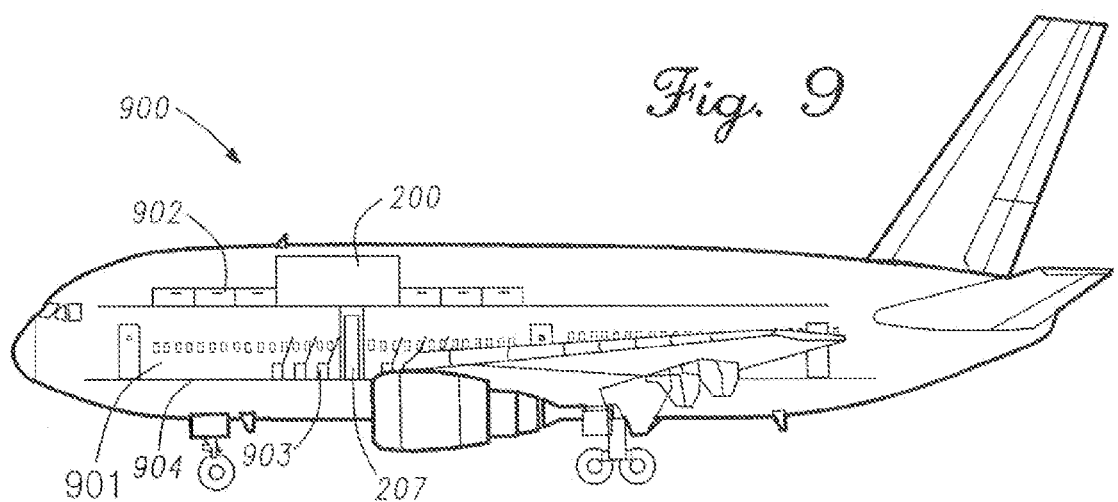
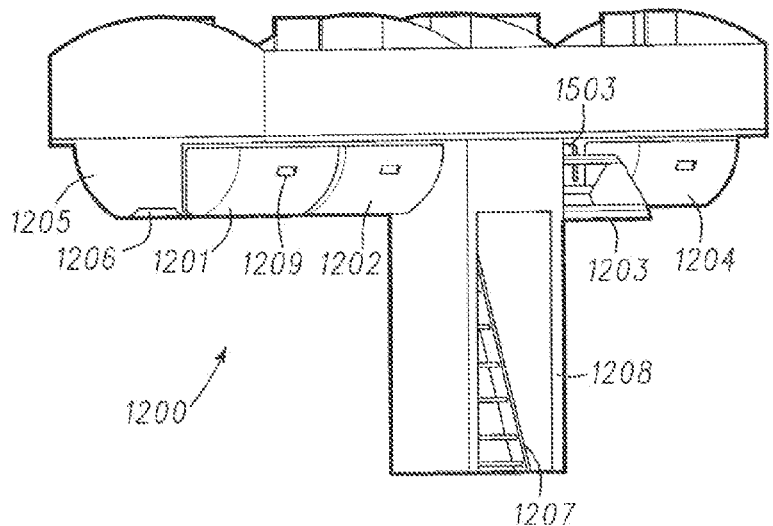
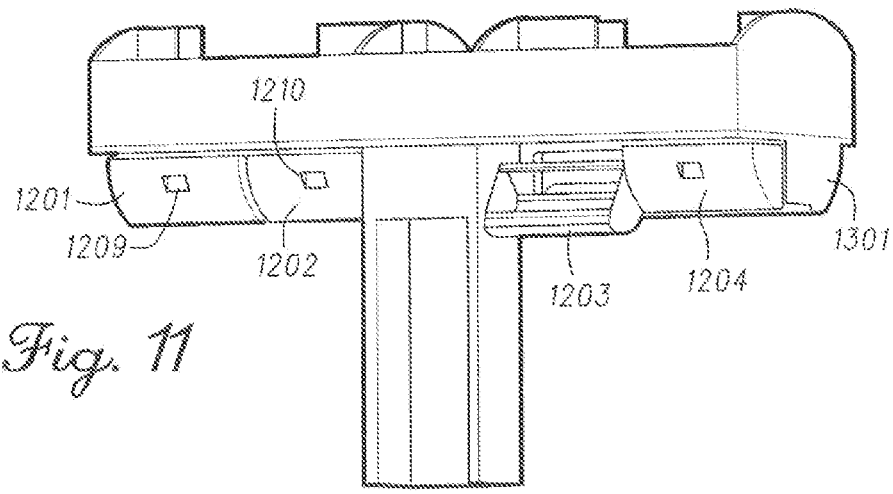

MODULE FOR ACCOMMODATION OF CREW MEMBERS HAVING A STOWAGE BIN USABLE FROM INSIDE THE MODULE

CROSS-REFERENCE TO RELATED APPLICATION

This application is a continuation of International Application No. PCT/EP2008/052287, filed Feb. 26, 2008, which was published under PCT Article 21(2) and which claims priority to German Patent Application No. 102007009280.8 filed Feb. 26, 2007, claims priority to German Patent Application No. 102007009278.6 filed Feb. 26, 2007, claims priority to U.S. Provisional Patent Application No. 60/891,562 filed Feb. 26, 2007 and of U.S. Provisional Patent Application No. 60/891,565 filed Feb. 26, 2007, the disclosure of which applications is hereby incorporated herein by reference.

TECHNICAL FIELD

The present invention relates to accommodation compartments in aircraft. In particular, the present invention relates to a module for an aircraft for the accommodation of crew members, to an aircraft comprising such a module, and to the use of such a module in an aircraft.

BACKGROUND

At present, crew rest compartments (CRCs) are installed in various positions in aircraft. For example, crew rest compartments are installed on the main deck or above the passenger cabin, often referred to as overhead crew rest compartments (OHCRCs), or they are installed below the main deck (e.g., bulk crew rest compartments (BCRCs)).

At present, overhead crew rest compartments are designed such that it may be possible to install a stowage bin chain (hat rack) that is situated below the crew rest compartment. In this way almost the entire storage space of the stowage bin may be available to passengers. In contrast to this, the crew in the crew rest compartment may be hardly any storage options and thus very limited space.

The absence of storage space in the crew rest compartment may result in a lack of comfort for the crew. Furthermore, the hitherto used concepts may not make it possible to adapt the distribution of storage space.

SUMMARY

According to an exemplary embodiment of the present invention, a module for an aircraft for the accommodation of crew members is stated, wherein the module is designed for installation in the ceiling region of a passenger cabin of the aircraft, wherein the module comprises a floor region with a module stowage bin of the aircraft, wherein the module stowage bin is accessible from the interior of the module, and wherein the dimensions of the module stowage bin correspond to the dimensions of a conventional stowage bin used in aircraft.

In other words, a module is stated which comprises at least one module stowage bin of its own that is fully integrated in the module. The dimensions of this module stowage bin correspond, for example, to the dimensions of conventional stowage bins that are used in aircraft. However, this module stowage bin is accessible by the crew who are accommodated in the interior of the module. The module stowage bin can thus, for example, be used for the storage of shoes, bedding, baggage or emergency equipment. It is no longer necessary to store these items in the cabin.

According to another exemplary embodiment of the present invention, the module stowage bin is integrated in the module.

Due to the integration of the module stowage bin in the module, a stable design of the overall module may become possible because the stowage bin and the crew rest compartment no longer form separate components. Thus, the module may have a good stability and may be simple to manufacture.

Furthermore, the comfort of both the crew and the passengers may be enhanced by an increase in the available space or in the flexibility of the available space.

According to a further exemplary embodiment of the present invention, the floor region of the module comprises an exterior contour that corresponds to the contour of further stowage bins installed in the aircraft.

In this way the module can be integrated in a stowage bin chain of the aircraft, without the need to carry out additional construction measures such as corresponding adaptation or the like.

According to a further exemplary embodiment of the present invention, the external contour of the floor region of the module is closed so that the module stowage bin is accessible exclusively from the interior of the module.

In this way the stability of the module may be further improved because the lower outer shell of the module can be designed as a single part without comprising any openings. Overall, the production of the combination comprising the module and the stowage bin may be simplified in this manner because it is no longer necessary to produce the two components individually and to install them individually in the aircraft, but instead the stowage bin is already integrated in the module.

According to a further exemplary embodiment of the present invention, the module is designed to replace at least part of an existing stowage bin chain of the aircraft.

As a result of the above, the effort required for installing the module in the aircraft may be reduced. In an aircraft already fitted out, individual stowage bins (hat racks) may be de-installed and replaced by the module. Retrofitting may thus take place without any problems and without any increased expenditure.

According to a further exemplary embodiment of the present invention, the modular stowage bin comprises an inward-directed opening with a closing arrangement or a cover, wherein the closing arrangement can be opened and closed.

The crew can thus access the individual modular stowage bins during the flight and can secure the items contained therein from falling out in that the closing arrangement is closed.

The closing arrangement may, for example, also be a rubber net or a guard net or retainer net.

With the use of a sliding door, which can, for example, be slid laterally to open the closing arrangement, or which is slid upwards to open the closing arrangement, no free space in front of the closing arrangement is necessary to obtain access to the module stowage bin.

According to a further exemplary embodiment of the present invention, the closing arrangement is designed as a trap door or a sliding door. With the use of a sliding door, which is, for example, slid laterally to open the closure, or which is slid upwards to open the closure, no free space in front of the closure may be necessary to obtain access to the modular stowage bin.

According to a further exemplary embodiment of the present invention, the closure is designed as a bed that can be hinged up sideways (i.e., laterally, which bed is arranged on the modular stowage bin).

There may thus be no need for an extra hinged lid or sliding door. Instead, a bed that is arranged in the module is used for securing the load against falling out.

According to a further exemplary embodiment of the present invention, the module further comprises an ascent unit for crew members to climb up from one level of the passenger cabin into the interior of the module.

The ascent unit may be designed in the form of a type of cabin or as a staircase in which a flight of stairs or a ladder is arranged.

Access to the module is, for example, from the cockpit, from the galley or from the passenger cabin. To this effect the module can be arranged in the front of the aircraft, in the middle section or in the rear of the aircraft.

According to a further exemplary embodiment of the present invention, the module further comprises a rest region for crew members, wherein the rest region comprises a bed.

The module may thus not only be used to accommodate crew members, but also for sleeping.

For example, the module can be arranged in the front region of the aircraft in order to allow direct access from the cockpit. In this way the pilot does not need to open the security door between the cockpit and the passenger cabin. Furthermore, the module can be arranged in the middle region of the aircraft or in the rear region of the aircraft. Ascent can, for example, take place from the galley, or it can be arranged instead of an on-board lavatory.

According to a further exemplary embodiment of the present invention, the module further comprises a work area, wherein the floor region comprises a stowage bin storage space of the aircraft, wherein the stowage bin storage space is accessible from the interior of the module, and wherein the work area is in part arranged in the stowage bin storage space.

In this way the space which would otherwise be taken up by (module-external or module-internal) stowage bins may be utilized by the crew in the interior of the module. Instead of a modular stowage bin flap, a work area may be installed at this position, with the floor of the work area corresponding to the external skin of the module. With this design, crew comfort may be significantly enhanced and an increased degree of flexibility may be achieved.

According to a further exemplary embodiment of the present invention, the work area comprises a chair and a table.

Furthermore, additional chairs or tables may be provided. Moreover, if necessary, further items of equipment (e.g., a work light or a fax machine) or a connection (e.g., power outlet) may be provided.

According to a further exemplary embodiment of the present invention, an aircraft is stated which comprises such a module.

According to a further exemplary embodiment of the present invention, the module stowage bin is accessible both from the passenger cabin and from the interior of the module.

In this way the comfort of the crew and of the passengers may be enhanced by a better or more flexible seating arrangement.

In other words a module is stated which comprises at least one module stowage bin of its own that is useable in a flexible way. Access to the module stowage bin may be gained both from the interior of the crew rest compartment and from the passenger cabin. This may make it possible to flexibly use the storage space. Disturbance of passengers is prevented when a crew member accesses the stowage bin from the interior of the module. In this way the storage space options in the aircraft may be significantly improved, which may lead to an increase in the level of comfort.

The dimensions of this module stowage bin correspond, for example, to the dimensions of conventional stowage bins that are used in aircraft. The module stowage bin may thus, for example, be used for the storage of shoes, bedding, baggage or emergency equipment of the crew. It may no longer be necessary to store these items in the cabin because they can now be accommodated in the module.

According to a further exemplary embodiment of the present invention, the module stowage bin comprises a locking mechanism, wherein the locking mechanism is designed such that the module stowage bin is accessible from the passenger cabin only to selected users.

For example, according to a further exemplary embodiment of the present invention, the locking mechanism can be designed in the form of a number lock, an electronic lock or a sensor for scanning a fingerprint, or the locking mechanism can comprise such an element.

In this way it may be ensured that the module stowage bin can be used only by defined users, for example by the flight crew. Furthermore, access can be individualized such that in each case a module stowage bin can only be opened by a specified user. In this way any use by passengers may be impossible, so that emergency equipment or similar, which must only be operated by crew members, can be accommodated therein.

According to a further exemplary embodiment of the present invention, the module stowage bin is designed as a module stowage bin that can be lowered during opening.

In this way operation of the module stowage bin from the passenger cabin may be facilitated because the bin hinges down during opening so that the placement or removal of objects is facilitated.

According to a further exemplary embodiment of the present invention, the module stowage bin forms part of the bottom region of the module and is thus immovable. The module stowage bin may thus be completely integrated in the bottom of the module. The bottom of the module is, for example, designed so as to be trough-shaped and in one piece so that as a result of this the stability of the module may be improved. At the same time, savings in production costs may be achieved.

According to a further exemplary embodiment of the present invention, for the purpose of being opened from the passenger cabin, the module stowage bin comprises a hinged lid or a sliding door or a rubber net. For example, the stowage bin is completely integrated in the bottom trough of the module and is immovable. In order to access said stowage bin from the passenger cabin, the hinged lid or sliding door can be operated accordingly.

Furthermore, according to a further exemplary embodiment of the present invention, the use of a module in an aircraft is stated.

BRIEF DESCRIPTION OF THE DRAWINGS

The present invention will hereinafter be described in conjunction with the following drawing figures, wherein like numerals denote like elements, and:

FIG. 9 shows a cross-sectional view of an aircraft with a module according to an exemplary embodiment of the present invention;

FIG. 10 shows a perspective view of a module according to an exemplary embodiment of the present invention;

FIG. 11 shows a further perspective view of the module shown in FIG. 10;

The illustrations in the figures are diagrammatic and not to scale.

DETAILED DESCRIPTION

The following detailed description is merely exemplary in nature and is not intended to limit application and uses. Furthermore, there is no intention to be bound by any theory presented in the preceding background and summary or the following detailed description.

Figure 1A:
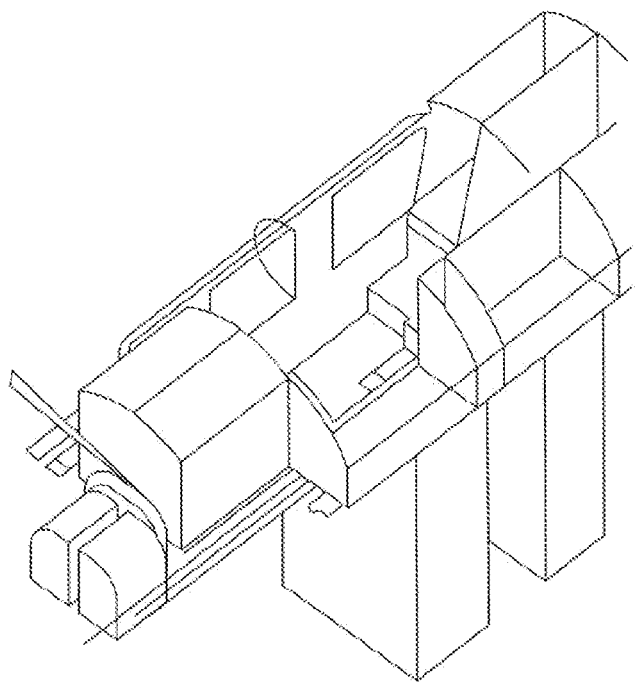
FIG. 1A shows a crew rest compartment according to the state of the art.

FIG. 1A shows a perspective view of a crew rest compartment, as disclosed, for example, in U.S. Pat. No. 6,520,451.

Figure 1C:
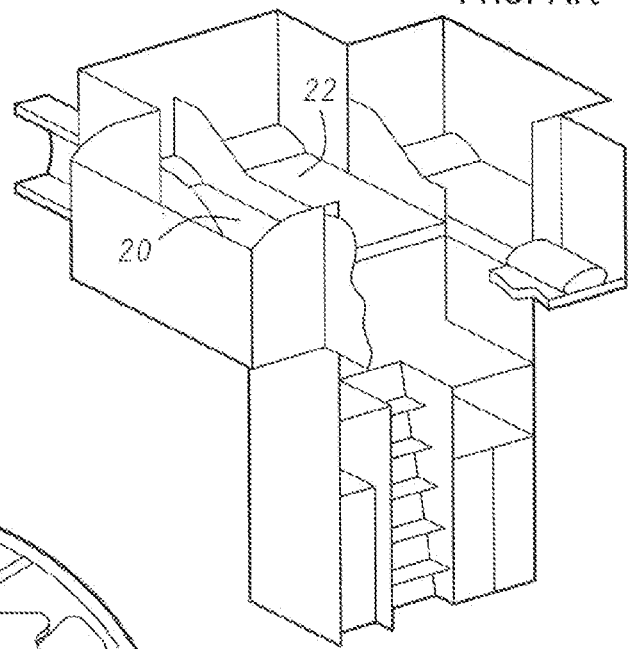
FIG. 1C shows a further crew rest compartment according to the state of the art.
Figure 1B:
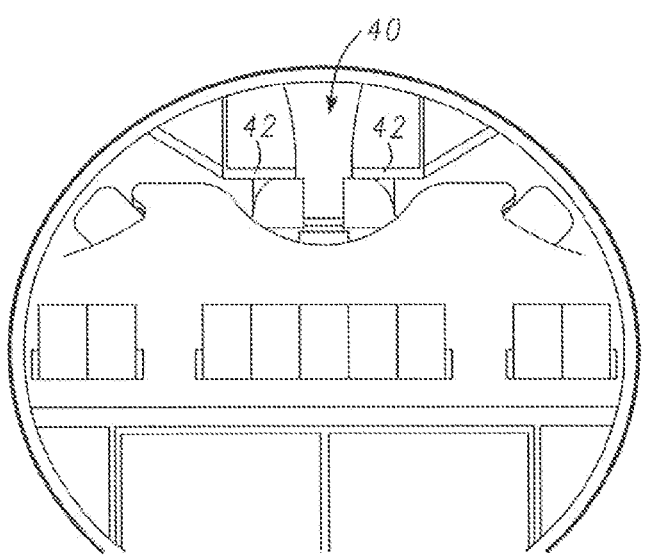
FIG. 1B shows a diagrammatic cross-sectional view of a passenger cabin comprising a crew rest compartment according to the state of the art.

FIG. 1B shows a section view of an aircraft fuselage, in which in the ceiling region a further crew rest compartment is installed, as disclosed, for example, in EP 0 901 964.

The crew rest compartments of FIGS. 1A and 1B are characterized in that they may be used exclusively as a rest zone for the crew. During installation, the crew rest compartments are integrated in the ceiling region of the aircraft, above the stowage bin chain. The original stowage bins continue to be useable by the passengers and do not form part of the crew rest compartment modules.

FIG. 1C shows a perspective view of a further crew rest compartment, as disclosed in EP 1 010 617. The crew rest compartment comprises a way up beside which trolleys are arranged. This crew rest compartment, too, is in part integrated above the stowage bin chain (e.g., hat rack chain).

None of the three crew rest compartments according to FIG. 1A, FIG. 1B or FIG. 1C may provide a substantial amount of storage space for the crew. The hat racks are not integrated in the crew rest compartment but instead form independent components that are accessible from the passenger cabin (i.e., from below, by passengers). Using the hat racks from the interior of the compartments may not be possible. Furthermore, hat racks and compartments have to be installed separately in the aircraft fuselage.

In other words, there may thus be a lack of storage space in the crew rest compartment, which may lead to an associated lack of comfort for the crew. Furthermore, the hitherto used concepts also may not make it possible to adapt the distribution of storage space, which may lead to a lack of flexibility.

Figure 2:
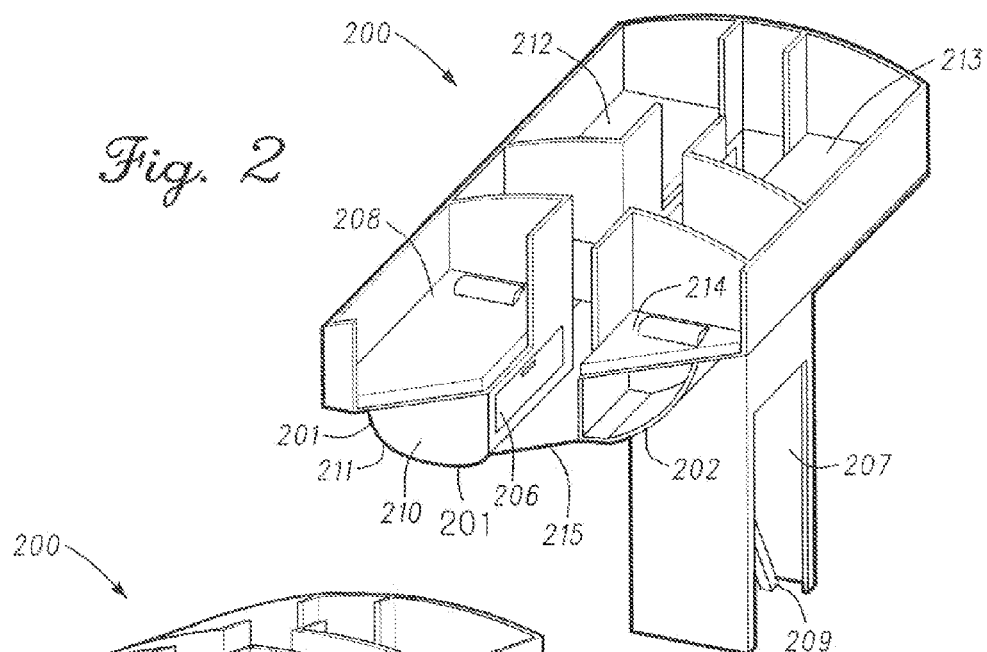
FIG. 2 shows a perspective view of a module according to an exemplary embodiment of the present invention.

FIG. 2 shows a perspective view of a module for an aircraft for the accommodation of crew members according to an exemplary embodiment of the present invention. The crew rest compartment or module 200 comprises several beds 208, 212, 213, 214 where crew members can sit or lie down. Moreover, several storage space cells, see for example storage cell 210, are integrated in the module 200. These storage space cells comprise an external contour 211 that corresponds to the hat rack contour in the aircraft.

It may thus be possible, for example, in an aircraft that is already in use, to remove installed hat racks from the stowage bin chain. The module 200 can then be inserted into the resulting gap. As far as the passengers are concerned, by and large there is no visual difference between the surface of the module bottom 211, 215 and the adjoining hat racks for the passengers (not shown in FIG. 2).

It should be noted that the beds may also be arranged in some other way, for example rotated by 90 degrees, in other words across the direction of flight.

The individual modular stowage bins 201, 202 that are integrated in the module 200 comprise openings that are closed off from the interior of the module by means of hinged lids 206. In this way they may be used as storage space for baggage, blankets, pillows, shoes or other items that are used by the crew.

Furthermore, a way up or an ascent unit 207 is provided that allows access from the passenger cabin or from a level below the passage floor 215 of the module into the interior of the module 200. It should be noted that such an ascent unit 207, which is, for example, designed in the form of a vestibule, is not mandatory.

Instead, it may also be possible to simply provide a recess, for example in the floor region 215 of the module, into which recess a ladder 209 or some other ascent device is inserted.

This means that the storage space 210 can be used from the interior of the module 200. As shown in FIG. 2, the storage space 210 is closed off towards the bottom so that a continuous lower outer surface of the module 200 results. The module 200 can thus be trough-shaped in the lower region without there being a need to provide recesses in the storage space regions. As a result of this the stability of the module is considerably enhanced. Furthermore, production is simplified as a result of this, because the lower trough-shaped region 211 is designed in one piece and without any interruptions.

The use of the storage space from the module 200 or crew rest compartment may make possible additional storage space options for the crew, as well as the installation of seats or tables or other objects, for example cupboards or entertainment media.

In other words, the present invention provides for the use of the stowage bin storage space by way of the crew rest compartment. With the use of the stowage bin storage space, which, for example, is accessible exclusively from the interior of the crew rest compartment, the crew can stow shoes, bedding, baggage, emergency equipment and the like. Up to now, such items had to be in part also accommodated in the passenger cabin.

Instead of the stowage bin flaps, which would otherwise be located on the undersides of the modular stowage bins 201, 202, a ceiling shaped in an identical contour may be installed (i.e., the outer skin of the crew rest compartment can be closed accordingly). In this arrangement the storage space obtained may be delimited towards the inside of the module 200 by means of a sliding door, trap door 206 or without a door (in other words, comprising a non-closable opening, see also FIG. 3 to FIG. 5).

Owing to the relatively high standing height in the interior of the module 200, furthermore the installation of seats or cupboards (e.g., for hanging garments, for example between two beds), may also be possible (see in particular FIG. 6 to FIG. 10).

As an alternative, furthermore, the use of beds that can be folded away laterally is possible, which beds are used to close the storage spaces 210 and which when hinged up may make it possible to access the storage spaces 210. With this design, crew comfort may be significantly improved and an increased degree of flexibility may be achieved.

A combination of conventional stowage bins and the converted stowage bin storage space may also be possible. The module 200 can thus, for example, comprise four modular stowage bins 201, 202, which in each case are, for example, arranged underneath the beds 208, 212, 213, 214. In the region between the beds 208 and 212, for example, stowage bins (conventional stowage bins) can be affixed from the outside, to which stowage bins the passengers have access. To this effect the module 200 then comprises a correspondingly modified external contour so that the conventional stowage bins can be placed against the module 200 from below. Furthermore, individual modular stowage bins 201, 202 can be accessible both from the inside of the module and from below, in other words from the passenger cabin.

Figure 3:
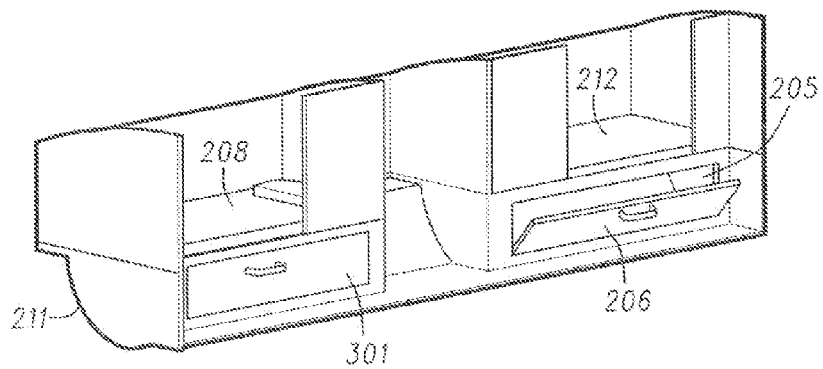
FIG. 3 shows a perspective view of a sub-region of a module according to an exemplary embodiment of the present invention.

FIG. 3 shows a perspective view of a sub-region of a module according to an exemplary embodiment of the present invention. Below the beds 208, 212 in each case a storage space is arranged whose floor area comprises an external contour 211 that corresponds to that of the conventional hat rack contour. Furthermore, storage space doors 301, 206 are provided which can be hinged down for opening. The closing arrangement comprises, for example, one or several magnets.

The closing arrangement can also comprise locks that are operable by way of corresponding keys, key cards or by way of a fingerprint.

After the hinged lid 206 has been opened, access to the interior of the modular stowage bin is possible by way of the opening 205.

In the case of hinged-up beds there may be no need to provide a hinged lid 206.

Figure 4:
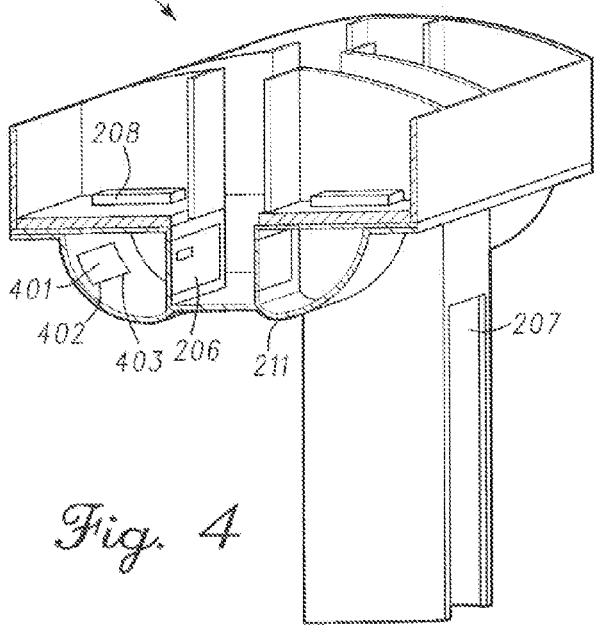
FIG. 4 shows a perspective view of a module with an ascent unit according to a further exemplary embodiment of the present invention.

FIG. 4 shows a perspective view of a module with an ascent unit 207, by way of which ascent unit 207 ascent from the cockpit or, for example, from the passenger cabin (also from a lower-lying level) to the interior of the crew rest compartment may become possible.

As shown in FIG. 4, the lower region (floor region) of the module 200 comprises a closed contour, as a result of which the stability of the module may be significantly increased. Furthermore, in this way production may be simplified because the underside is constructed in a trough-shaped manner.

Furthermore, flaps 401 or sliding doors are provided in order to allow access to the storage space from the passenger cabin. The hinged lid 401 is held by way of the hinges 402, 403.

Figure 5:
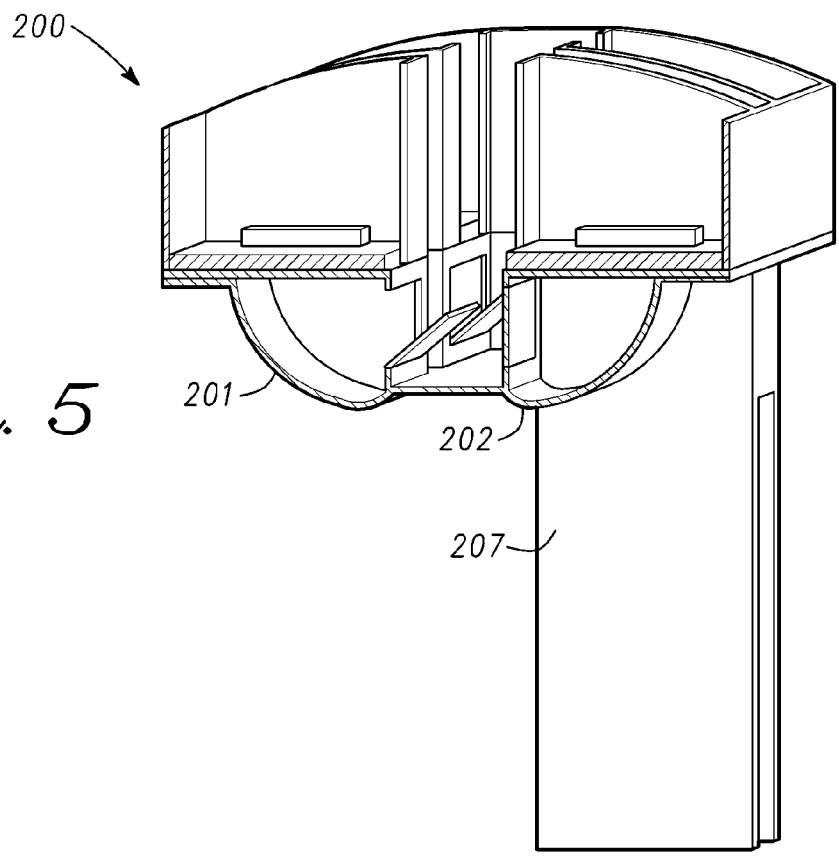
FIG. 5 shows a perspective view of a module with an ascent unit according to a further exemplary embodiment of the present invention.

FIG. 5 shows a perspective view of a module 200 with an ascent unit 207 according to a further exemplary embodiment of the present invention. In this exemplary embodiment no openings and hinged lids to the passenger cabin are provided in the stowage bins 201, 202.

Figure 6:
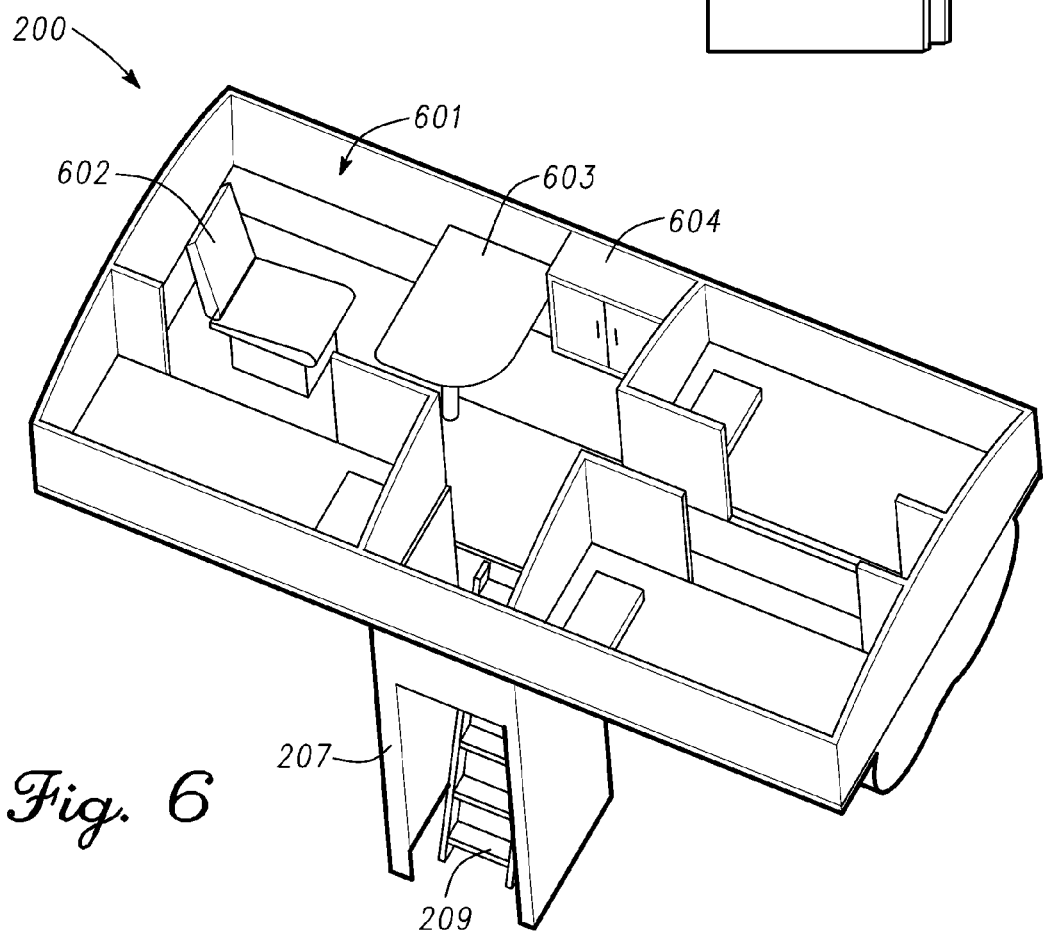
FIG. 6 shows a perspective view of a module with an ascent unit and a work area according to a further exemplary embodiment of the present invention.

FIG. 6 shows a perspective view of a module with a work area 601. The work area 601 comprises, for example, one or several chairs 602, one or several tables 603, and/or one or several cupboards or shelves 604. For example, the work area 601 is arranged in a location where otherwise there would be a berth or a bed.

The module is thus not only used as a rest zone but also as a work area comprising a chair and a desk as well as corresponding electrical connections or electrical devices, for example a lamp, a computer and a monitor. Such a work area is important because the leading steward or the leading stewardess has to process various forms or documentation during the flight. Such processing now no longer has to take place in the passenger cabin but can instead take place in a separate region as defined by the module 200.

To provide the work area, the stowage bin storage space can be used that is defined by the module 200. By using the stowage bin storage space, access to which is exclusively from the interior of the crew rest compartment, the space that becomes free can be used for the integration of a work area.

Figure 7:
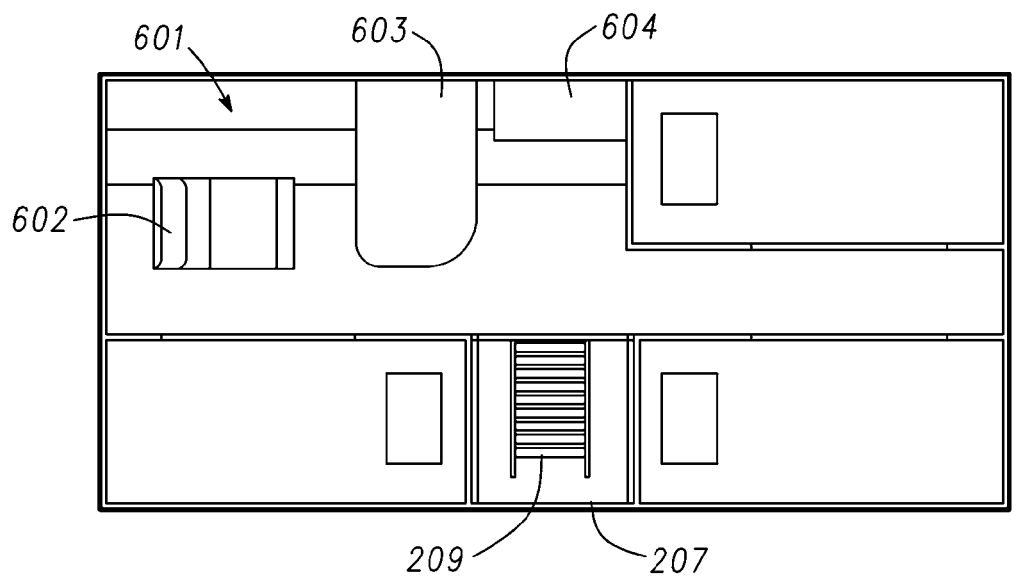
FIG. 7 shows a top view of the module shown in FIG. 6.

FIG. 7 shows a top view of the module shown in FIG. 6. In particular, FIG. 7 shows the ladder 209 for the ascent unit 207. By using the stowage bin storage space for the work area 601, comfort in the module 200 is significantly enhanced.

Figure 8:
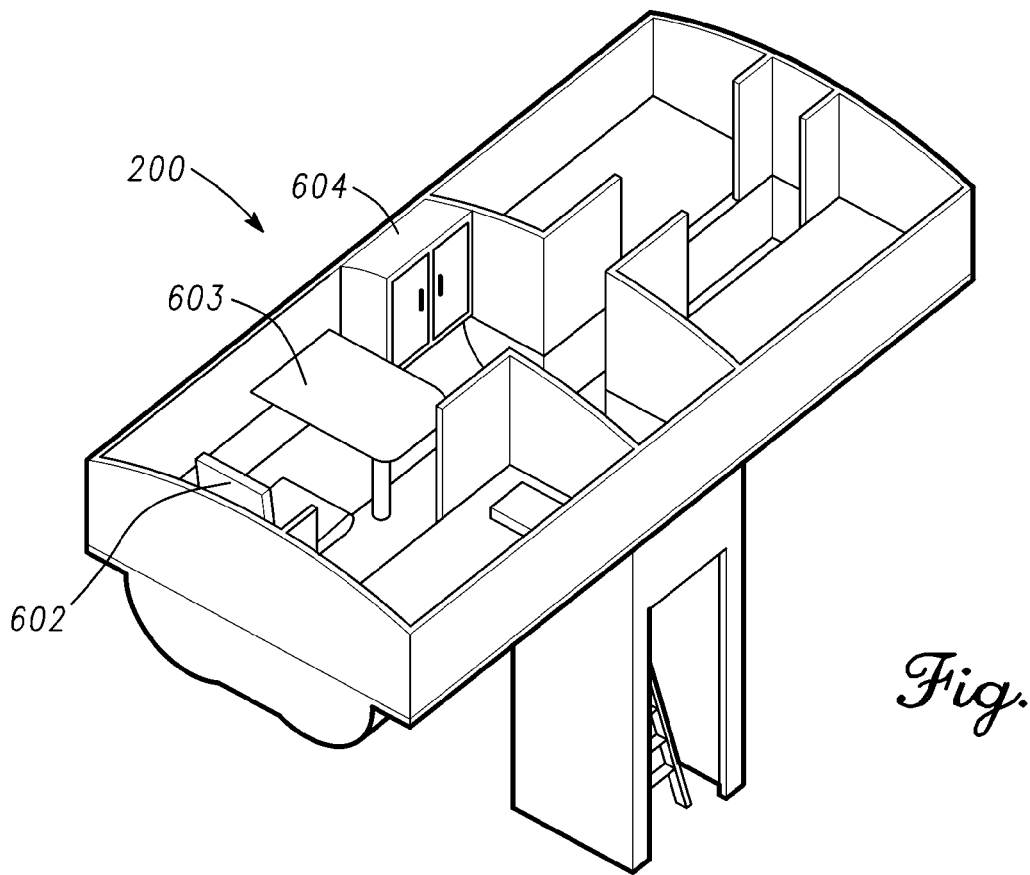
FIG. 8 shows a perspective view of a module according to a further exemplary embodiment of the present invention.

FIG. 8 shows a perspective view of a module 200 from another angle of view.

FIG. 9 shows a cross-sectional view of an aircraft 900 with a module 200. In the passenger cabin 901, seats 903, hat racks 902 and a crew rest compartment module with a staircase 207 are arranged. Reference character 904 shows the main deck level, from which the staircase 207 affords access to the interior of the module 200.

FIG. 10 shows a perspective view of a module for an aircraft for the accommodation of crew members according to an exemplary embodiment of the present invention. The crew rest compartment or module 1200 comprises several module stowage bins 1201, 1202, 1203, 1204 whose shape, when seen from the passenger cabin, corresponds to that of an existing hat rack chain.

Each of the module stowage bins 1201 to 1204 comprises an individual locking mechanism 1209 which needs to be operated in order to open the corresponding stowage bin. The locking mechanism 1209 comprises, for example, a lock (e.g., a number lock, a fingerprint scanner or similar) so that use by unauthorized persons (e.g., by passengers) is prevented. Furthermore, a corresponding sign can be provided.

The module stowage bins 1201 to 1204 are designed so that they can be lowered. However, other module stowage bins are also possible which are locked by means of a hinged lid or sliding door or the like and cannot be lowered. Such stowage bins are affixed on the other side of the module 1200 (see reference character 1205).

The above are bins that are installed so as to be fixed, which bins are formed by the bottom region of the module 1200 and are thus fully integrated in the module.

The provision of stowage bins in the module makes it possible for the crew to access storage space for bed linen, emergency equipment and the like both from the interior of the module and from the passenger cabin at any time. For example, bed linen can be placed into the stowage bin from the passenger cabin. There is no need to enter the crew rest compartment for the purpose of placing items into the bin.

With the use of these special stowage bins, which externally correspond to the "ordinary" stowage bins but which can only be used by the crew and which are moreover arranged in the immediate vicinity of the crew rest compartment or which form part of the crew rest compartment, apart from an increase in the level of comfort it is also possible to provide necessary or additional storage space for the crew.

Furthermore, a way up 1208 is provided that comprises a flight of stairs or a ladder 1207. This flight of stairs or ladder 1207 is not shown in the following FIG. 11 to FIG. 16. This flight of stairs or ladder 1207 allows access from the passenger cabin or from a level below the passage floor 1206 of the module 1200 into the interior of the module. It should be noted that such a way up 1208, which is, for example, designed in the form of a vestibule, is not mandatory. Instead, it is also possible to simply provide a recess, for example in the floor region 1206 of the module, into which recess 1206 the ladder 1207 or some other ascent device is inserted.

The storage space provided as a result of the movable module stowage bins 1201 to 1204 or the fixed module stowage bins 1205 can be used from the interior of the module 1200. On one side of the module the storage space is closed off towards the bottom so that a continuous lower outer surface of the module 1200 results. Only recesses in the underside of the module are provided, in which recesses hinged lids 1601 are installed (see FIG. 13).

The module 1200 can thus be trough-shaped in the lower region. As a result of this the stability of the module is considerably enhanced. Furthermore, production is simplified as a result of this, because the lower trough-shaped region is designed in one piece without any interruptions or right angles and comprises only comparatively small recesses.

The use of the storage space from the module 1200 or crew rest compartment may make possible additional storage space options for the crew, as well as the installation of seats or tables or other objects, for example cupboards or entertainment media of the module.

FIG. 11 shows a further perspective view of the module shown in FIG. 10. Each of the module stowage bins 1201 to 1204 has a locking arrangement 1209 or 1210 of its own. The lower contour 1301 of the module corresponds to the contour of the conventional hat racks.

Figure 12:
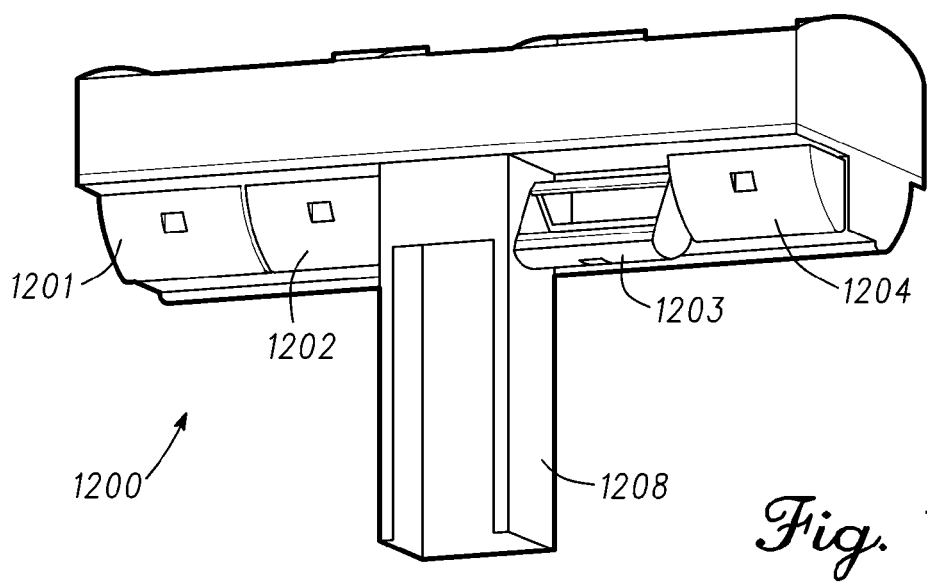
FIG. 12 shows a further perspective view of a module according to an exemplary embodiment of the present invention.

FIG. 12 shows a further perspective view of a module 1200.

In the interior of the module, the module stowage bins can comprise sliding doors or hinged doors. As an alternative, it is also possible to provide rubber nets.

It is also possible to provide a combination of movable stowage bins and rigid, firmly integrated stowage bins, as shown in FIG. 10 to FIG. 12.

Figure 13:
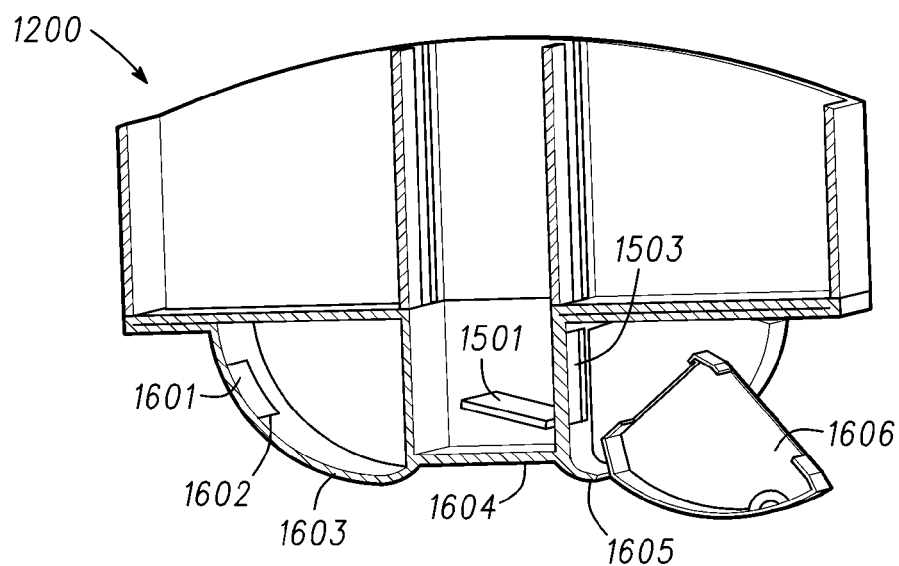
FIG. 13 shows a perspective section view of a module according to a further exemplary embodiment of the present invention.

FIG. 13 shows a perspective section view of a module 1200. As shown in FIG. 13, the module stowage bin 1603 comprises a hinged lid 1601 that hinges open towards the passenger cabin, which hinged lid 1601 is connected to the module stowage bin 1603 by way of a hinge 1602. Flaps 1501 are provided to cover an opening 1503 into the interior of the module. The bottom 1603, 1604, and 1605 of the module is designed in one piece in the form of a bottom trough that comprises an opening for the movable stowage bin 1606.

Figure 14:
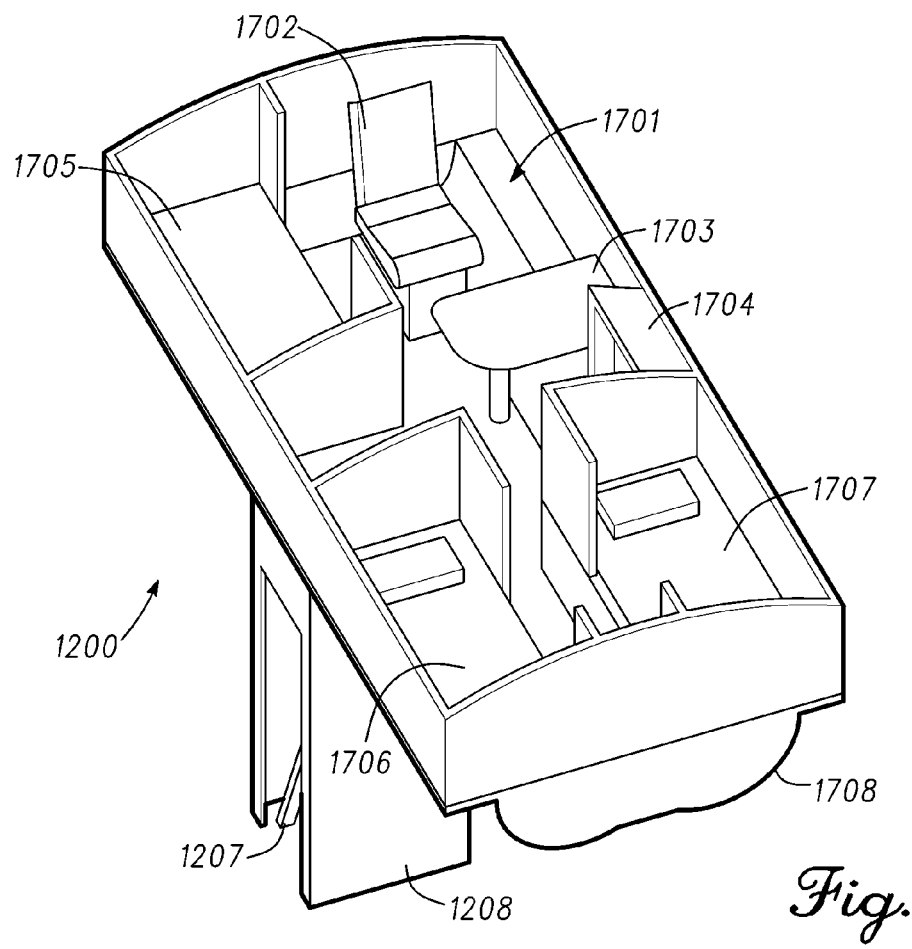
FIG. 14 shows a perspective view of a module according to a further exemplary embodiment of the present invention.

FIG. 14 shows a perspective view of a module 1200 according to a further exemplary embodiment of the present invention. In its interior the module 1200 comprises a rest region 1701 and respective bed regions or beds 1705, 1706, and 1703. Rest region 1701 comprises, for example, a seat or chair 1702, a table 1703 and a cupboard or shelf 1704. The rest region 1701 is at least partly arranged in a region in which otherwise a module stowage bin would be arranged. By providing this work area the level of crew comfort is further improved. The bottom 1708 of the module of FIG. 14 is completely closed. No movable stowage bins are provided.

The module according to the invention provides advantages not only in relation to improved stability and simplified production, but also in relation to significantly enhanced storage space options for the crew, significantly improved comfort for the crew, an improvement in the working conditions for the crew, increased flexibility in the arrangement of seats or cupboards or tables, and in an extremely effective use of the available storage space. Overall, a clearly enhanced potential for the future arrangement of beds, storage devices, seats etc. in the crew rest compartment is provided. Owing to the increased standing height the installation of seats and of cupboards for hanging clothing in is possible (e.g., as an alternative to module stowage bins). The storage space can be arranged directly in the entrance region of the module so that the crew can access the stored items quickly, directly from the interior of the module. Furthermore, the module allows clear separation between the storage space for passengers and the storage space for the crew.

Figure 15:
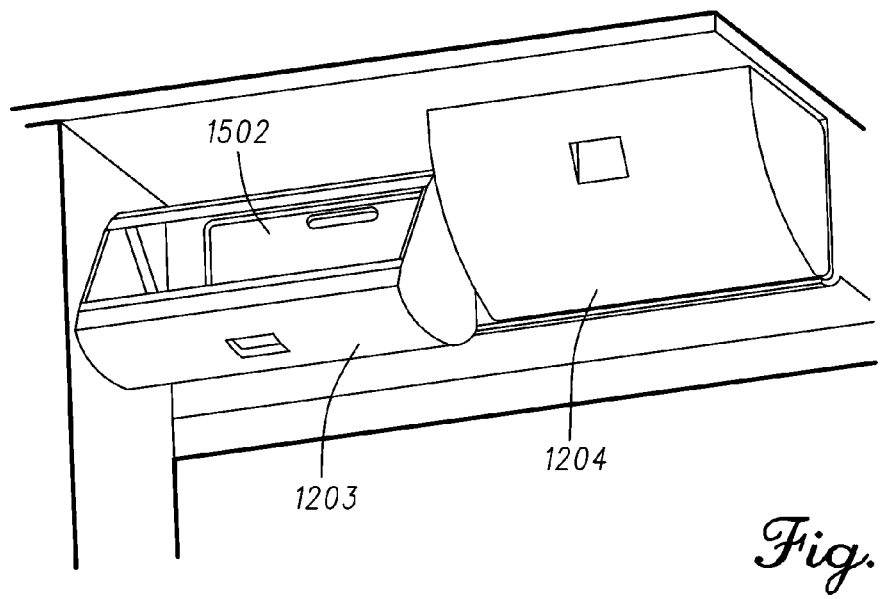
FIG. 15 shows a detailed view of a module region according to an exemplary embodiment of the present invention.

FIG. 15 shows a detailed view of a module region. The hinged lid 1502 to the interior of the module is closed.

The module according to the invention provides advantages not only in relation to improved stability and simplified production, but also in relation to significantly enhanced storage space options for the crew, significantly improved comfort for the crew, an improvement in the working conditions for the crew, increased flexibility in the arrangement of seats or cupboards or tables, and in an extremely effective use of the available storage space. Overall, a clearly enhanced potential for the future arrangement of beds, storage devices, seats etc. in the crew rest compartment is provided. Owing to the increased standing height the installation of seats and of cupboards for hanging clothing in may be possible (e.g., example as an alternative to modular stowage bins).

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A module in an aircraft for an accommodation of crew members, comprising:
    an interior;
    a floor region comprising a module stowage bin of the aircraft integrated therein; and
    an access to the module stowage bin from the interior;
    wherein the module is designed for installation in a ceiling region of a passenger cabin of the aircraft; and
    wherein the floor region and said module stowage bin comprise an external contour that corresponds to a hatrack contour of a hatrack chain in the aircraft.

2. The module of claim 1, wherein the exterior contour is closed so that the module stowage bin is exclusively accessible from the interior of the module.

3. The module of claim 1, wherein the module stowage bin comprises an inward-directed opening with a closing arrangement that is adapted to be opened and closed.

4. The module of claim 3, wherein the closing arrangement is designed as a trap door.

5. The module of claim 3, wherein the closing arrangement is designed as a bed that can be hinged up sideways and arranged on the module stowage bin.

6. The module of claim 3, wherein the closing arrangement is designed as a sliding door and a rubber net.

7. The module of claim 3, wherein the closing arrangement is designed as rubber net.

8. The module of claim 1, further comprising an ascent unit for the crew members to climb up from a level of the passenger cabin into the interior of the module.

9. The module of claim 1, further comprising a rest region for the crew members wherein the rest region comprises a bed.

10. The module of claim 1, further comprising a work area, wherein the floor region comprises a stowage bin storage space of the aircraft, wherein the stowage bin storage space is accessible from the interior of the module, and wherein the work area is in part arranged in the stowage bin storage space.

11. The module of claim 10, wherein the work area comprises a chair and a table.

12. The module of claim 1, wherein the module stowage bin is integrated in the module.

13. The module of claim 1, wherein the module stowage bin is accessible both from the passenger cabin and from the interior of the module.

14. The module of claim 13, wherein the module stowage bin comprises a locking mechanism, wherein the locking mechanism is designed such that the module stowage bin is accessible from the passenger cabin only to selected users.

15. The module of claim 14, wherein the locking mechanism comprises a lock.

16. The module of claim 13, wherein the module stowage bin is designed to be lowered when opened from the passenger cabin.

17. The module of claim 13, wherein the module stowage bin is designed to form part of a bottom region of the module and is thus immovable when opening.

18. The module of claim 13, wherein the module stowage bin comprises a hinged lid.

19. An aircraft, comprising:
a fuselage; and
a module for an accommodation of a crew member, the module arranged within the fuselage, the module comprising:
an interior;
a floor region comprising a module stowage bin of the aircraft integrated therein; and
an access to the module stowage bin from the interior,
wherein the module is designed for installation in a ceiling region of a passenger cabin of the aircraft; and
wherein the floor region and said module stowage bin comprise an external contour that corresponds to a hatrack contour of a hatrack chain in the aircraft.

* * * * *